US006795715B1

(12) United States Patent
Kubo et al.

(10) Patent No.: US 6,795,715 B1
(45) Date of Patent: *Sep. 21, 2004

(54) PORTABLE COMMUNICATION DEVICE WITH CAMERA INTERFACE FOR IMAGE TRANSMISSION AND RECEPTION

(75) Inventors: Yoshimi Kubo, Kanagawa (JP); Kazuo Motoki, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/534,431

(22) Filed: Mar. 23, 2000

(30) Foreign Application Priority Data

Mar. 25, 1999 (JP) .......................................... P11-081822

(51) Int. Cl.[7] .............................. H04M 1/00; H04N 7/14
(52) U.S. Cl. .................. 455/556.1; 455/557; 455/90.3; 455/90.1; 455/566; 348/14.02; 348/220.1
(58) Field of Search ............................... 455/556, 557, 455/90, 575, 3.06, 550, 566, 344, 128, 556.1; 348/220, 211, 207, 372, 375, 14, 552; 386/117, 120–121

(56) References Cited

U.S. PATENT DOCUMENTS

| 5,367,522 | A | * | 11/1994 | Otani | 370/84 |
| 5,414,444 | A | * | 5/1995 | Britz | 345/156 |
| 5,465,119 | A | * | 11/1995 | Demos | 348/447 |
| 5,491,507 | A | * | 2/1996 | Umezawa et al. | 348/14 |
| 5,592,508 | A | * | 1/1997 | Cooper | 375/216 |
| 5,612,732 | A | * | 3/1997 | Yuyama et al. | 348/14 |
| 5,666,159 | A | * | 9/1997 | Parulski et al. | 348/211 |
| 5,734,424 | A | * | 3/1998 | Sasaki | 348/222 |
| 5,751,350 | A | * | 5/1998 | Tanaka | 348/231 |
| 5,969,749 | A | * | 10/1999 | Imaeda | 348/14 |
| 5,999,697 | A | * | 12/1999 | Murase et al. | 386/101 |
| 6,009,336 | A | * | 12/1999 | Harris et al. | 455/566 |
| 6,067,571 | A | * | 5/2000 | Igarashi et al. | 709/232 |
| 6,122,526 | A | * | 9/2000 | Parulski et al. | 455/556 |
| 6,226,449 | B1 | * | 5/2001 | Inoue et al. | 386/120 |
| 6,308,084 | B1 | * | 10/2001 | Lonka | 455/556 |

FOREIGN PATENT DOCUMENTS

| JP | 406268582 | * | 9/1994 | ............ H04B/7/26 |
| WO | WO 98/48548 | * | 10/1998 | ............ H04M/1/00 |

* cited by examiner

Primary Examiner—Duc M. Nguyen
(74) Attorney, Agent, or Firm—Frommer Lawrence & Haug LLP; William S. Frommer; Dennis M. Smid (57) ABSTRACT

A portable telephone set includes an image pickup unit, an input terminal for inputting an image from the outside, a display unit for displaying an image, an image input switching key for performing a switching operation in which any one of an image photographed by the image pickup unit and the image input from the input terminal is displayed on the display unit and transmitted from the portable telephone set, and an output terminal for outputting the image photographed by the image pickup unit. The image pickup unit is detachably connected to a portable telephone body by a plug and a jack, whereby there is provided such a portable telephone set which is capable of photographing and transmitting an image by only the portable telephone set and easily performing photographing at a desired angle even during speech communication using the portable telephone set.

10 Claims, 8 Drawing Sheets

PORTABLE COMMUNICATION DEVICE WITH CAMERA INTERFACE FOR IMAGE TRANSMISSION AND RECEPTION

BACKGROUND OF THE INVENTION

1. Field of the Invention

The present invention relates to a portable communication device such as a portable telephone set and, more particularly, to a communication device which is designed to solely perform photographing, transmission, and the like of an image.

2. Description of the Related Art

In recent years, it has been realized to transmit and receive a static image at a high speed by using a portable communication device such as a portable telephone set, an armature handy phone (PHS), or an armature radio system on the basis of an increase in data communication rate and progress in digital image compression technique in digital mobile communication.

For example, a user can transmit a static image photographed by herself/himself from a digital portable telephone set to a personal computer connected to a telephone line by one method of the following methods (a), (b), and (c).

(a) A digital still camera is connected to a portable telephone set through a dedicated cable, and the static image photographed by the digital still camera is transmitted from the portable telephone set.

(b) A personal computer, having a digital video input terminal, in which video capture software is installed is connected to a digital video camera through a digital video cable, and an image sequence or moving image photographed by the digital video camera is captured to the personal computer as static images by the video capture software. The personal computer is connected to a portable telephone set through a dedicated cable, and the static images captured in the personal computer are transmitted from the portable telephone set.

(c) A personal computer having a digital still camera built therein is connected to a portable telephone set through a dedicated cable, and a static image photographed by the built-in camera is transmitted from the portable telephone set.

However, according to any one of these methods, and a digital still camera, a digital video camera, or a personal computer are required other than a portable telephone set. For this reason, the portable telephone set cannot solely photograph a static image and transmit the image.

In these methods, for example, when a user wants to photograph her/his face, a surrounding landscape, or the like during speech communication through a portable telephone set, the user must operate both the portable telephone set and the camera. For this reason, the operation becomes cumbersome. In addition, during speech communication through a portable telephone set, in order to perform photographing at a desired angle, it is considerably difficult to change the directions of the digital still camera, the digital video camera, and the personal computer and recognize present angles by seeing the display units of the digital still camera, the digital video camera, and the personal computer.

SUMMARY OF THE INVENTION

The present invention has been made in consideration of the above points, and has as its object to make it possible to photograph and transmit an image by only a portable communication device such as a portable telephone set, a PHS, or an armature radio device and to easily photograph the image at a desired angle during an interaction using the portable communication device.

In order to solve this problem, the present applicant proposes a portable communication device such as a portable telephone set, a PHS, and an armature radio device, including: image pickup means; an input terminal for inputting an image from the outside; display means for displaying the image; image switching means for performing a switching operation in which any one of an image photographed by the image pickup means and the image input from the input terminal is displayed on the display means and transmitted from the portable communication device; and an output terminal for outputting the image photographed by the image pickup means.

In this portable communication device, image pickup means, display means for displaying an image, and image input switching means being capable of switching the image displayed on this display means and transmitted from the portable communication device to an image photographed by the image pickup means are arranged in the portable communication device itself.

Therefore, since the image photographed by the image pickup means of the portable communication device itself can be transmitted from the portable communication device, the portable communication can solely photograph and transmit the image.

It is sufficient to change the direction of the image pickup means of the portable communication device itself is satisfactorily changed in order to change a photographing angle, and it is sufficient to see an image displayed on the display means of the portable communication device itself in order to check a present angle. For this reason, photographing can be easily performed at a desired angle even during an interaction using the portable communication device.

In addition, an input terminal for inputting an image from the outside is arranged in the portable communication device. In the image input switching means, an image displayed on the display means and transmitted from the portable communication device can be switched to an image input from the input means.

Therefore, an image output from an external device can be displayed on the display means of the portable communication device and can also be transmitted from the portable communication device (with respect to the display, the portable communication device is used as a display unit).

Furthermore, in the portable communication device, since an output terminal for outputting an image photographed by the image pickup means, the image photographed by the image pickup means can also be output from the output terminal and recorded on an external device or displayed on an external display unit (i.e., the portable communication device is used as an electronic camera).

In this portable communication device, as an example, it is preferable that the image pickup means is rotatably connected to the body of the portable communication device.

In this manner, in order to change a photographing angle, since it is sufficient to rotate only the image pickup means without changing the direction of the body of the portable communication device, it is more easy to perform photographing at a desired angle.

In this portable communication device, as an example, it is more preferable to detachably connect the image pickup means to the body of the portable communication device with a plug.

In this manner, this plug is removed (i.e., the image pickup means is removed from the body of the portable communication device), an extension cable is connected to the plug, and the image pickup means and the body of the portable communication device are connected to each other through the extension cable, so that the direction of the image pickup means can be freely changed, it is more further easy to perform photographing at a desired angle.

In the portable communication device, as an example, it is preferable to make the display means to display an image and to display information (in other words, information to be displayed when speech communication is performed by the portable communication device) obtained in a standard operation of the portable communication device commonly and to further include display switching means for performing a switching operation in which any one of the image and the information obtained in the standard operation is displayed on the display means.

In this manner, in comparison with a case in which display means for displaying an image and display means for displaying information obtained in a standard operation are independently arranged, the portable communication device can be decreased in size.

In this portable communication device, as an example, it is preferable to include image pickup means for photographing an image sequence as image pickup means, to arrange a video input terminal and a video output terminal as an input terminal and an output terminal, and to further include static image capture means to capture a static image from an image sequence or memory image and image-sequence/static image switching means to perform a switching operation in which any one of the image sequence and the static image captured by the static image capture means is transmitted from the portable communication device.

In this manner, an image sequence photographed by image pickup means, an image sequence reproduced from an external VTR and input from the video input terminal, or an image sequence photographed by an external video camera and input from the video input terminal can be displayed on the display means and can be transmitted from the portable communication device.

In addition, these image sequences can also be transmitted as static images.

Furthermore, an image sequence photographed by the image pickup means can also be output from the video output terminal and recorded on an external VTR or displayed on the screen of an external television set (i.e., the portable communication device is used as a video camera).

In this portable communication device, as an example, it is preferable to further include storing means for storing an image and transmission/storage switching means for performing a switching operation in which the image is transmitted from the portable communication device or stored in the storing means.

In this manner, an image photographed by the image pickup means and an image input from the input terminal can be stored in the portable communication device and then transmitted without being immediately transmitted from the portable communication device.

In the image input switching means, the display switching means, the image sequence/static image switching means, and the transmission/storage switching means, as an example, it is preferable to arrange buttons for performing instruction in a switching operation and processing means for performing the switching operation on the basis of the operations of the buttons.

In this manner, a user can arbitrarily perform the switching operation by operating the buttons.

In this portable communication device, as an example, it is preferable to also make the display means to display an image received by the portable communication device also.

In this manner, since the image received by the portable communication device is displayed on the display means of the portable communication device itself, the received image can also be displayed by only the portable communication device.

DETAILED DESCRIPTION OF THE PREFERRED EMBODIMENT

An example in which the present invention is applied to a digital portable telephone set of a digital system will be described below.

Figure 1:
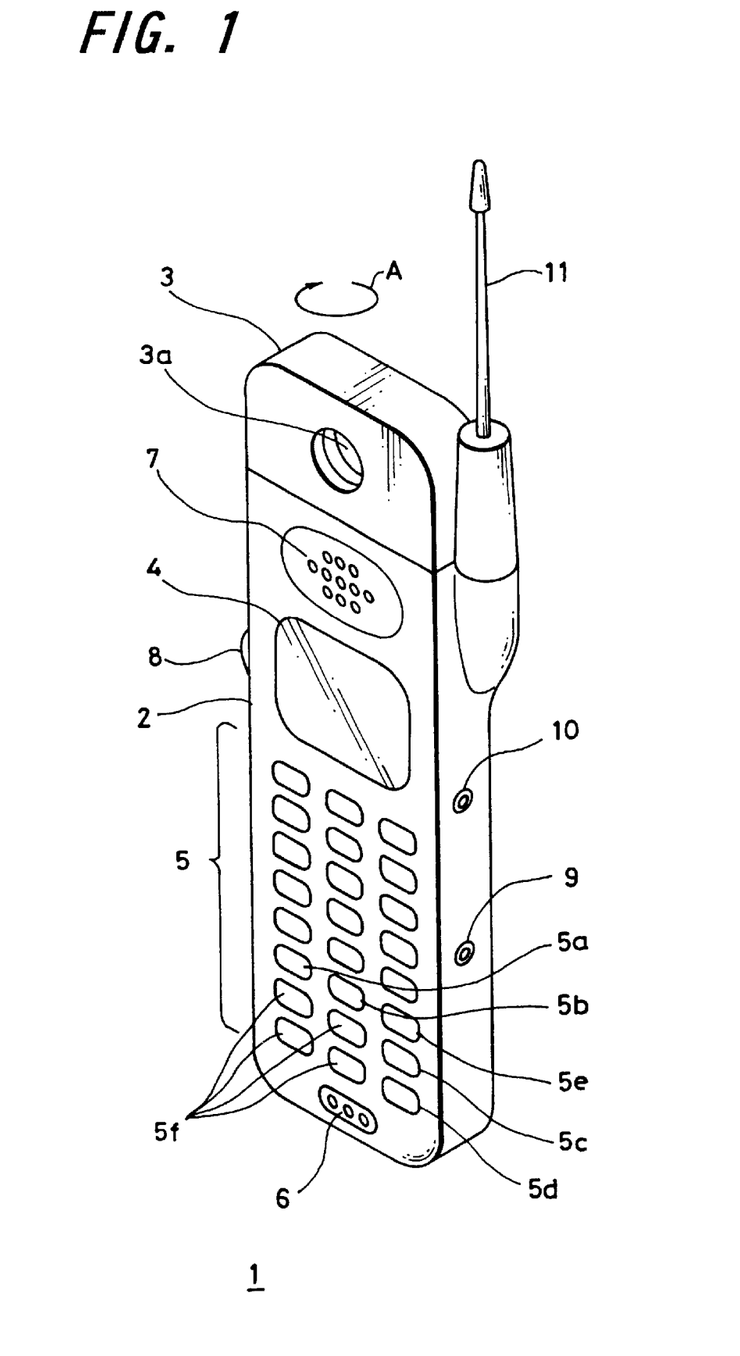
FIG. 1 is a perspective view showing an example of the outside configuration of a portable telephone set to which the present invention is applied.

FIG. 1 is an example of the outside configuration of a digital portable telephone set to which the present invention is applied.

In the portable telephone set 1, a camera unit 3 is connected to the upper portion of a portable telephone body 2.

In the camera unit 3, a light-receiving portion and a photoelectric converter having the same configuration as that of a light-receiving portion (lens group) and a photoelectric converter (image pickup element such as a CCD image pickup element or a CMOS sensor and a drive circuit therefor) in a video camera are arranged. Of these parts, a lens 3a is seen in FIG. 1.

The camera unit 3 is pivotally or rotatably connected to a shaft member (not shown) extending in the direction of the height of the portable telephone body 2.

In this manner, the camera unit 3 can be pivoted or ratated at 360° in the direction of an arrow A in FIG. 1 with respect to the portable telephone body 2.

Therefore, when only the camera unit 3 is pivoted or rotated with a hand without changing the direction of the portable telephone body 2, the lens 3a can be pointed to the front-surface side of the portable telephone body 2 to photograph a user herself/himself, or the lens 3a can be pointed to the rear-surface side or side-surface side of the portable telephone body 2 to photograph a surrounding landscape.

In the portable telephone body 2, a display unit 4, a keyboard 5, a microphone 6, and a loudspeaker 7 are arranged on the front surface, a jog dial 8, a video input terminal 9, and a video output terminal 10 are arranged on the side surface, and an antenna 11 is arranged on the upper surface.

The display unit 4 is an image display unit such as a color TFT liquid-crystal display unit.

The display unit 4 is used to display an image and to display information (e.g., a telephone number of a speech-communication destination, a speech communication time, or the like) obtained in a standard operation of the portable telephone set 1.

On the keyboard 5, in addition to keys (e.g., a power supply key, keys used as a ten-key pad and character keys, an originating key, and the like) which are the same as those in an ordinary portable telephone set, a display switching key 5a, an image input switching key 5b, an image sequence or moving image transmission key 5c, a static image transmission key 5d, and a transmission/storage switching key 5e are arranged.

The display switching key 5a is a key for causing a user to perform instruction in a switching operation in which any one of the image and the information obtained in a standard operation of the portable telephone set 1 is displayed on the display unit 4.

The image input switching key 5b is a key for causing a user to perform instruction in a switching operation in which any one of an image photographed by the camera unit 3 and an image input from the video input terminal 9 is displayed on the display unit 4 and transmitted from the portable telephone set 1.

The transmission/storage switching key 5e is a key for causing a user to perform instruction in a switching operation in which an image is transmitted from the portable telephone set 1 or stored in the portable telephone set 1.

As a method of operating each of these keys 5a, 5b, and 5e, for example, the following method is employed. That is, the key is pressed once when one setting is switched to the other setting (the image is switched to the information obtained in the standard operation by pressing the key 5a, the image photographed by the camera unit 3 is switched to the image input from the video input terminal 9 by pressing the image input switching key 5b, and the transmission is switched to the storage by pressing the transmission/storage switching key 5e), and the key is pressed again when the present setting is switched to the past setting.

The image sequence transmission key 5c and the static image transmission key 5d are keys for causing a user to perform instruction in a switching operation in which any one of an image sequence and a static image is transmitted from the portable telephone set 1.

As a method of operating the keys 5c and 5d, for example, the following method is employed. The image sequence transmission key 5c is pressed to display an image sequence or moving image. On the other hand, in order to display a static image, the static image transmission key 5d is pressed when an image deisred to be transmitted as a static image is displayed while seeing an image sequence displayed on the display unit 4.

On the keyboard 5, as a key for operating the camera unit 3, a plurality of keys 5f (although four keys are used in FIG. 1, the number of keys is not limited thereto) which are the same as the keys for operating the camera portion are also arranged.

The microphone 6, the loudspeaker 7, the jog dial 8, and the antenna 11 have the same configurations and the same functions as those of a conventional portable telephone set.

In the portable telephone set 1, a circuit, which is similar to that in an ordinary digital portable telephone set, for communication of audio or character date (e.g., an electric mail) is arranged, and also a circuit for communication of an image is arranged.

Figure 2:
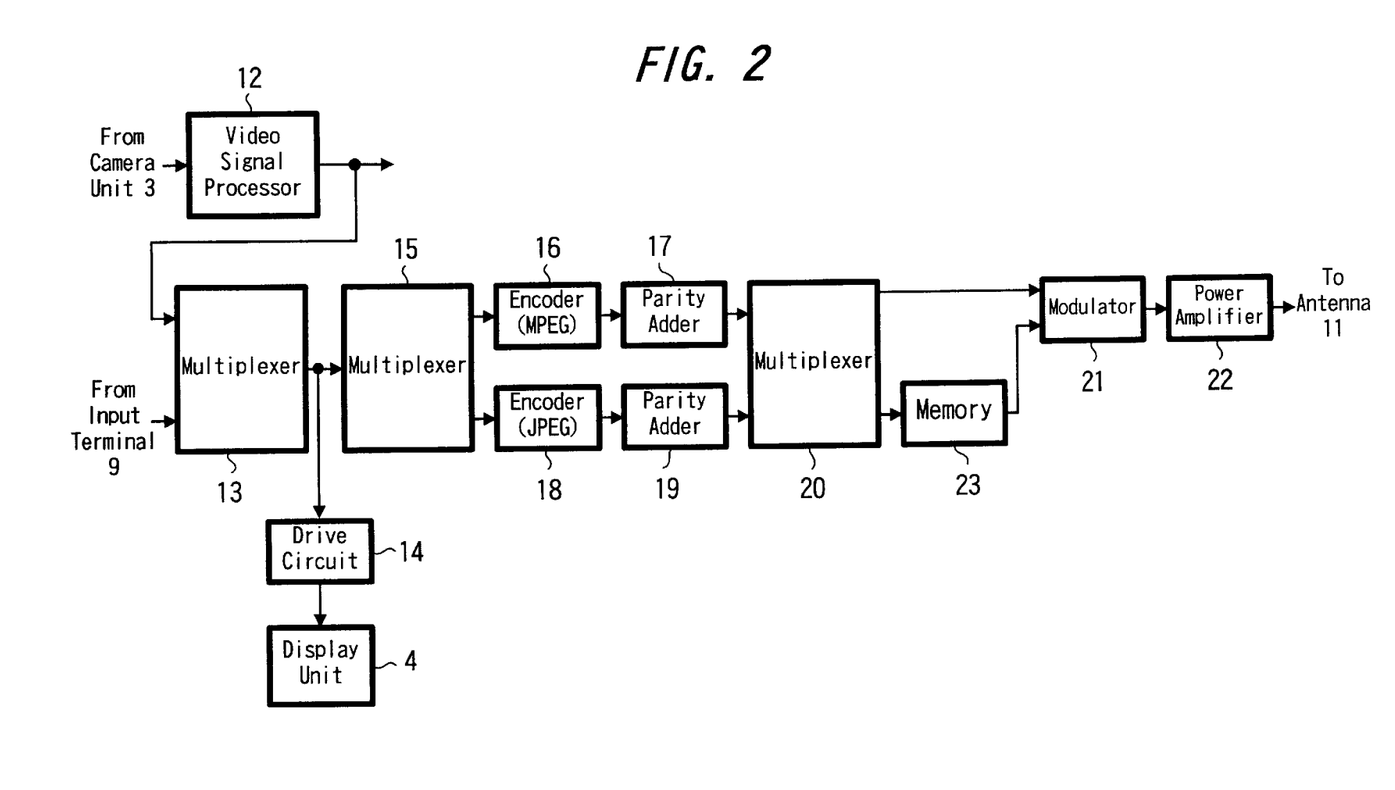
FIG. 2 is a block diagram showing an example of the configuration of an image transmission system of the portable telephone set in FIG. 1.

FIG. 2 is a block diagram showing an example of the configuration of a transmission system of the circuit for image communication.

An output signal of the image pickup element of the camera unit 3 is input to a video signal processing circuit 12. The video signal processing circuit 12 has the same configuration as that of a video signal processing circuit in a video camera, and performs auto gain control, a knee process, a luminance signal process, a chrominance signal process, modulation, and the like to an output signal from the image pickup element to generate a video signal such as a television signal in, e.g., in the NTSC system.

A video signal generated by the video signal processing circuit 12 is transmitted to the video output terminal 10 in FIG. 1 and input to one input terminal of a multiplexer (electronic switch) 13 having two inputs and one output. A video signal input from the video input terminal 9 in FIG. 1 is input to the other input terminal of the multiplexer 13.

The video signal output from the multiplexer 13 is transmitted to a drive circuit 14 for driving the display unit 4 in FIG. 1 and input to a multiplexer 15 having one input and two outputs.

The video signal output from one output terminal of the multiplexer 15 is transmitted to an encoder 16.

The encoder 16 compresses an image sequence or moving image by a coding system such as an MPEG.

Image data (image sequence data) obtained by compressing the video signal by the encoder 16 is added with a parity bit (check bit) by a parity addition circuit 17 and then input to one input terminal of a multiplexer 20 having two inputs and two outputs.

The video signal output from the other terminal of the multiplexer 15 is captured as static image data (to be described later) and then transmitted to an encoder 18.

The encoder 18 compresses a static image by a coding system such as a JPEG.

The static image data compressed by the encoder 18 is added with a parity bit by a parity addition circuit 19 and then input to the other input terminal of the multiplexer 20.

The image data output from one output terminal of the multiplexer 20 is transmitted to a modulator 21 to modulate a carrier wave thereof. This carrier wave is amplified by a power amplifier 22 and transmitted from the antenna 11 in FIG. 1.

The modulator 21 and the power amplifier 22 have the same configurations as those of a modulation and a power amplifier in the transmission system of an ordinary digital portable telephone set, and are also used to transmit audio or character data from the portable telephone set 1.

The image data output from the other output terminal of the multiplexer 20 is transmitted to a semiconductor memory 23 for storing an image.

The image data read from the semiconductor memory 23 is also input to the modulator 21.

Figure 3:
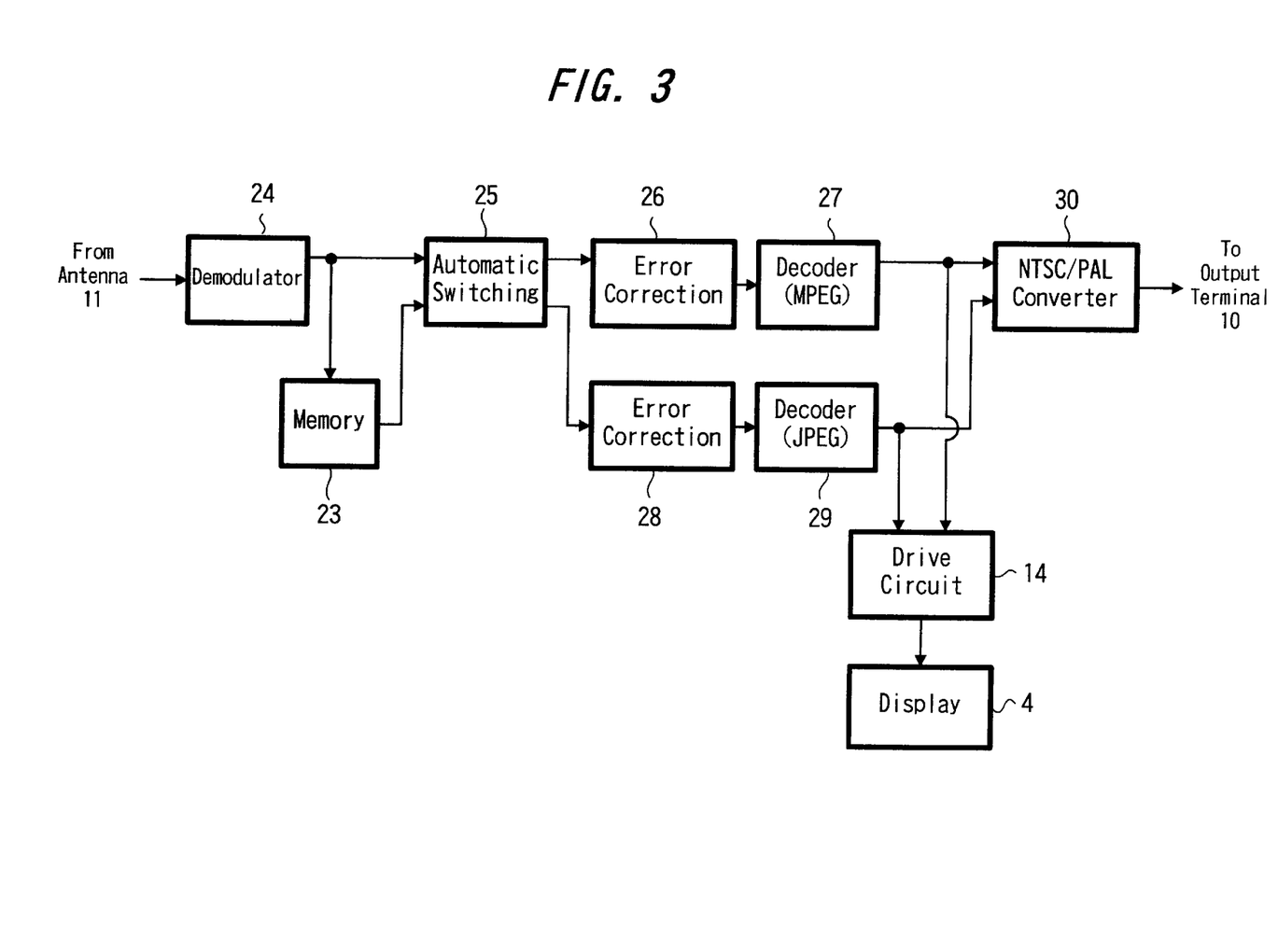
FIG. 3 is a block diagram showing an example of the configuration of an image reception system of the portable telephone set in FIG. 1.

FIG. 3 is a block diagram showing an example of the configuration of a reception system of the image communication circuit in the portable telephone set 1 (circuits indicated by the same reference numerals as in FIG. 2 are common circuits to the transmission system).

Image data is demodulated by a demodulator 24 from the carrier wave received by the antenna 11 in FIG. 1. The demodulator 24 has the same configuration as that of the demodulator in the reception system of an ordinary digital portable telephone set, and is also used to receive audio or character data through the portable telephone set 1.

The image data demodulated by the demodulator 24 is input to an automatic switching circuit 25 and transmitted to the semiconductor memory 23 also.

The image data read from the semiconductor memory 23 is also transmitted to the automatic switching circuit 25.

The automatic switching circuit 25 decides whether input image data is image sequence or moving image data or static image data, and, according to the decision result, performs a switching operation in which input image data is output from any one of two output terminals.

The image sequence data output from one output terminal of the automatic switching circuit 25 is subjected to error correction by an error correction circuit 26 using the parity bit added to the image sequence data. The resultant data is then transmitted to a decoder 27.

The decoder 27 extends the image sequence data by the same coding system as that used in the encoder 16 in FIG. 2.

The static image data output from the other terminal of the automatic switching circuit 25 is subjected to error correction by an error correction circuit 28 using the parity bit added to the static data. The resultant data is then transmitted to a decoder 29.

The decoder 29 extends the static image data by the same coding system as that used in the encoder 18 in FIG. 2.

A video signal obtained by extending the image sequence data by the decoder 27 is transmitted to a drive circuit 14 of the display unit 4 and input to an NTSC/PAL automatic conversion circuit 30.

The static image data extended by the decoder 29 is also transmitted to the drive circuit 14 and input to the NTSC/PAL automatic conversion circuit 30. Although not shown in FIG. 3, after the static image data extended by the decoder 29 is written in a memory in a still circuit, it is repeatedly read from the memory, transmitted to the drive circuit 14, and also input to the NTSC/PAL automatic conversion circuit 30.

The NTSC/PAL automatic conversion circuit 30 performs a system conversion between a video signal in the NTSC system and a video signal in the PAL system. For example, a video signal transmitted from a country in which the PAL system is employed and received by the portable telephone set 1 in Japan is converted into a video signal in the NTSC system by the NTSC/PAL automatic conversion circuit 30.

The video signal output from the NTSC/PAL automatic conversion circuit 30 is transmitted to the video output terminal 10.

Figure 4:
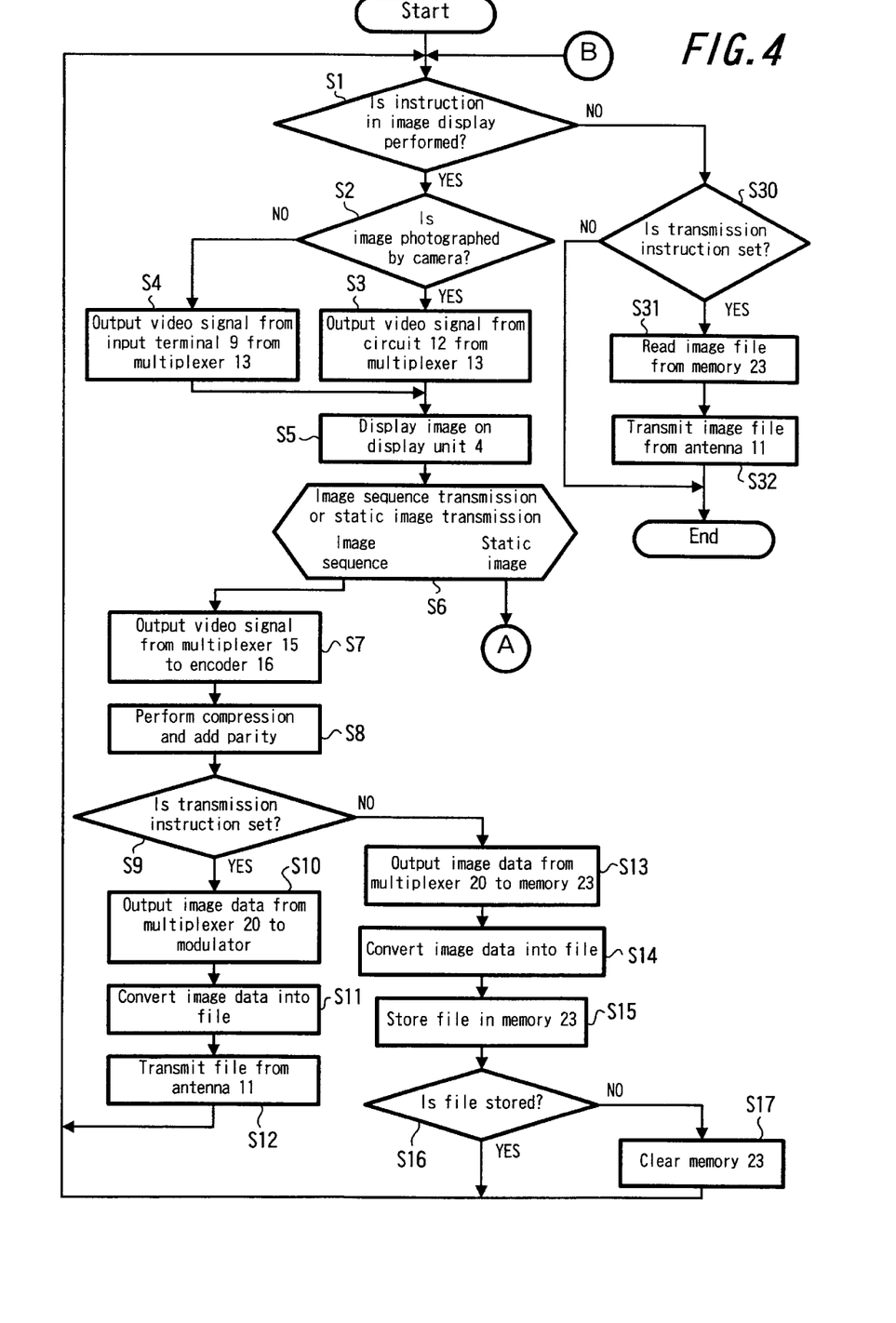
FIG. 4 is a flow chart showing an example of an image transmission process performed by the transmission system in FIG. 2.
Figure 5:
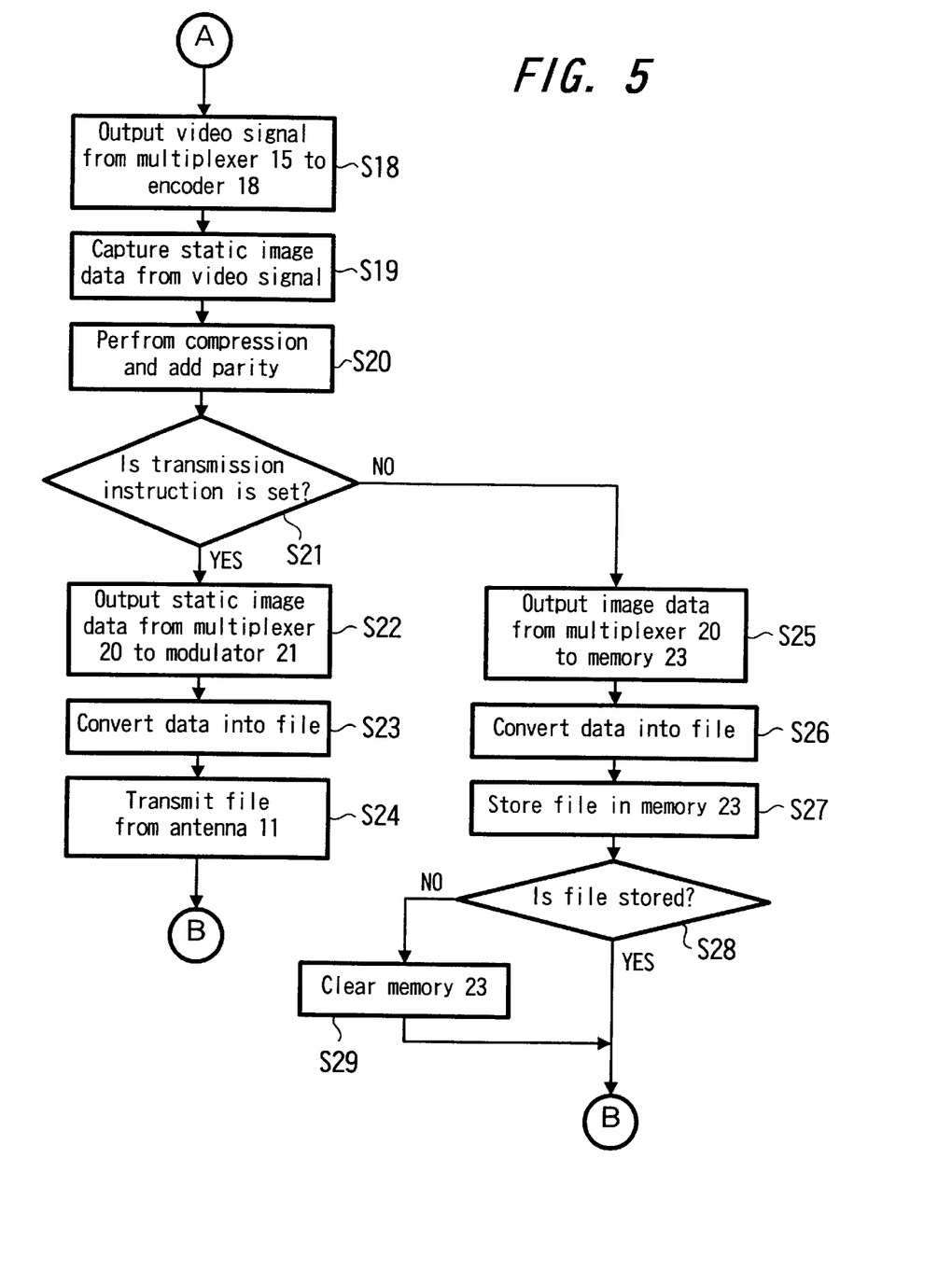
FIG. 5 is a flow chart showing another example of the image transmission process performed by the transmission system in FIG. 2.

The transmission process and the reception process of an image performed by the transmission system and the reception system shown in FIG. 2 and FIG. 3 are executed under the control of a microprocessor (not shown) in the portable telephone set 1. FIG. 4 and FIG. 5 are flow charts showing an example of the transmission process of an image performed by the transmission system in FIG. 2.

In this process, as shown in FIG. 4, first, the microprocessor decides whether instruction in an operation of displaying an image on the display unit 4 is performed by the operation of the display switching key 5a or not (step S1).

If YES in step S1, the microprocessor decides whether instruction in an operation of displaying and transmitting the image photographed by the camera unit 3 is performed by the operation of the image input switching key 5b or not (step S2).

If YES in step S2, the microprocessor controls the multiplexer 13 in FIG. 2 to output an input video signal from the video signal processing circuit 12 (step S3). The microprocessor shifts to step S5.

On the other hand, if NO is determined in step S2 (i.e., when instruction in an operation of displaying and transmitting a video image input from the video input terminal 9 is performed), the microprocessor controls the multiplexer 13 to output an input video signal from the video input terminal 9 (step S4). The microprocessor shifts to step S5.

In step S5, an image based on the video signal output from the multiplexer 13 is displayed on the display unit 4 by the drive circuit 16.

Subsequently, the microprocessor decides whether the image sequence transmission key 5c or the static image transmission key 5d is pressed or not (step S6).

When the image sequence transmission key 5c is pressed, the microprocessor controls the multiplexer 15 to output an input video signal from the output terminal on the encoder 16 side (step S7).

In this manner, the video signal output from the multiplexer 15 is transmitted to the encoder 16 to be compressed, and the compressed image sequence data is added with a parity bit by the parity addition circuit 17 (step S8).

Subsequently, the microprocessor decides whether instruction in an operation of transmitting an image is performed by the operation of the transmission/storage switching key 5e or not (step S9).

If YES in step S9, the microprocessor controls the multiplexer 20 to output the image sequence data input from the parity addition circuit 17 from an output terminal on the modulator 21 side (step S10).

The microprocessor converts the image sequence data into data of a file format (step S11).

In this manner, the image sequence file is transmitted to the modulator 21 to modulate a carrier wave, the modulated carrier wave is amplified by the power amplifier 22 and transmitted from the antenna 11 in FIG. 1 (step S12).

The microprocessor returns to step S1 to repeat the processes subsequent to step S1.

On the other hand, if NO is determined in step S9 (i.e., when instruction in an operation of storing an image sequence or moving image is performed), the microprocessor controls the multiplexer 20 to output the input image sequence data from an output terminal on the semiconductor memory 23 side (step S13).

Subsequently, the microprocessor converts the image sequence data into a file format (step S14).

The microprocessor stores the image sequence file in the semiconductor memory 23 (step S15).

Subsequently, the microprocessor decides whether all the image sequence files could be stored in the semiconductor memory 23 or not (step S16).

If YES in step S16, the microprocessor returns to step S1 to repeat the processes subsequent to step S1.

On the other hand, if NO is determined in step S16 (e.g., an amount of data of the image sequence files exceeds the capacity of the semiconductor memory 23), the microprocessor erases the data of the image sequence files stored in the semiconductor memory 23 at present (step S17). Thereafter, the microprocessor returns to step S1 to repeat the processes subsequent to step S1.

When it is determined in step S6 that the static image transmission key 5d is pressed, as shown in FIG. 5, the microprocessor controls the multiplexer 15 to output an input video signal from an output terminal on the encoder 18 side (step S18).

Subsequently, the microprocessor calls, e.g., video capture software to capture static image data from the output video image from the multiplexer 15 (step S19).

In this manner, the static image data is transmitted to the encoder 18 to be compressed, and the compressed static image data is added with a parity bit by the parity addition circuit 19 (step S20).

Subsequently, the microprocessor decides whether instruction in an operation of transmitting an image is performed by the operation of the transmission/storage switching key 5e or not (step S21).

If YES in step S21, the microprocessor controls the multiplexer 20 to output the static image data input from the parity addition circuit 19 from an output terminal on the modulator 21 side (step S22).

The microprocessor converts the static image data into a file format (step S23).

In this manner, the static image file is transmitted to the modulator 21 to modulate a carrier wave, and the modulated carrier wave is amplified by the power amplifier 22 and transmitted from the antenna 11 in FIG. 1 (step S24).

The microprocessor returns to step S1 in FIG. 4 to repeat the processes subsequent to step S1.

On the other hand, if NO is determined in step S21 (i.e., when instruction in an operation of storing a static image is performed), the microprocessor controls the multiplxer 20 to output the input static image data from an output terminal on the semiconductor memory 23 side (step S25).

Subsequently, the microprocessor converts the static data into a file format (step S26).

The microprocessor stores the static image file in the semiconductor memory 23 (step S27).

Subsequently, the microprocessor decides whether all the static files could be stored in the semiconductor memory 23 or not (step S28).

If YES in step S28, the microprocessor returns to step S1 in FIG. 4 to repeat the processes subsequent to step S1.

On the other hand, if NO is determined in step S28 (e.g., an empty capacity of the semiconductor memory 23 is short), the microprocessor erases the data of the static image file stored in the semiconductor memory 23 at present (step S29). Thereafter, the microprocessor returns to step S1 to repeat the processes subsequent to step S1.

If NO is determined in step S1 in FIG. 4 (i.e., when instruction in an operation of displaying information obtained in a standard operation on the display unit 4 is performed by the operation of the display switching key 5a), as shown in FIG. 4, the microprocessor decides whether instruction in an operation of transmitting an image by the operation of the transmission/storage switching key 5e is performed or not (step S30).

If YES in step S30, the microprocessor reads a stored image sequence file and a stored static image file from the semiconductor memory 23 (step S31).

In this manner, the image sequence file and the static image file are transmitted to the modulator 21 to modulate a carrier wave, and the modulated carrier wave is amplified by the power amplifier 22 and transmitted from the antenna 11 in FIG. 1 (step S32). Then the process is ended.

On the other hand, if NO is determined in step S30, the process is immediately ended.

Upon completion of the image transmission process, the same process for communication of audio or character data as in an ordinary portable telephone set is started.

In this process, a signal for displaying information obtained in a standard operation is input to the encoder 16, and the information is displayed on the display unit 4.

In the transmission process, the audio or character data is transmitted to the modulator 21, and a carrier wave modulated by the data is amplified by the power amplifier 22 and transmitted from the antenna 11 in FIG. 1.

In the reception process, audio or character data is demodulated by the demodulator 24 from the carrier wave received by the antenna 11 in FIG. 1.

In the middle of this process, when instruction in an operation of displaying an image on the display unit 4 is performed by the operation of the display switching key 5a, the process is ended, and the image transmission process shown in FIG. 4 and FIG. 5 is restarted.

As a method of determining a transmission destination of an image file in the process in FIG. 4 and FIG. 5, the following method may be employed. That is, for example, when a user operates the display switching key 5a and the image input switching key 5b during speech communication or data communication using the portable telephone set 1 to perform instruction in an operation of displaying and transmitting an image, the telephone number of the destination of the speech communication or the data communication is directly determined as the telephone number of the transmission destination of the image file. On the other hand, when the user operates the display switching key 5a and the image input switching key 5b while speech communication or data communication is not performed to perform instruction in an operation of displaying and transmitting an image, the user determines a telephone number designated by the operation of the ten key pad of the keyboard 5 or the jog dial 8 as the telephone number of the transmission destination of the image file.

An operation performed when an image is transmitted by using the portable telephone set 1 will be described below.

For example, when a user wants to photograph and transmit an image sequence or moving image by herself/himself, and the user performs instruction in an operation of displaying the image photographed by the camera unit 3 on the display unit 4 and transmitting the image from the portable telephone set 1 by the operations of the display switching key 5a, the image input switching key 5b, the image sequence transmission key 5c, and the transmission/storage switching key 5e.

When the user pivots or rotates only the camera unit 3 while holding the portable telephone body 2 of the portable telephone set 1 to point the lens 3a in a desired direction (e.g., when the user photographs herself/himself, the user points the lens 3a to the front-surface side of the portable telephone body 2 as shown in FIG. 1. When the user photographs the landscape in front of the user, the user points the lens 3a to the rear-surface side of the portable telephone body 2), the user operates the key 5f to start photographing by the camera unit 3.

When the user wants to change an object in the middle of the photographing, the user changes the direction of the lens 3a by pivoting or rotating the camera unit 3 only.

At this time, by the processes shown in FIG. 4 and FIG. 5, the image sequence photographed by the camera unit 3 is displayed on the display unit 4, output from the video output terminal 10, and converted into a file format. The file format is transmitted from the portable telephone set 1.

In the middle of the processes, when the user wants to transmit a static image, the user presses the static image transmission key 5d while watching images displayed on the display unit 4 when an image which is to be transmitted as a static image is displayed.

In this manner, by the processes shown in FIG. 4 and FIG. 5, the static image displayed at that time is converted into a file format. The file format image is transmitted from the portable telephone set 1.

When the user wants to store the photographed image sequence or static image in the portable telephone set 1 without immediately transmitting the image sequence or static image, the user performs instruction of an operation of storing the image by the operation of the transmission/storage switching key 5e.

In this manner, by the processes shown in FIG. 4 and FIG. 5, the image sequence or the static image is converted into a file format. The file format is stored in the semiconductor memory 23.

Upon completion of the photographing, when the user wants to transmit the stored image sequence or static image, the user performs instruction in an operation of displaying information obtained in a standard operation on the display unit 4 by the operation of the display switching key 5a. Thereafter, the user operates the transmission/storage switching key 5e to transmit an image.

In this manner, by the processes shown in FIG. 4 and FIG. 5, the image sequence file or the static image file is read from the semiconductor memory 23 and transmitted from the portable telephone set 1.

When the user wants to transmit an image sequence or moving image (or an image sequence photographed by an external video camera) reproduced from an external VTR, the user performs instruction in an operation of displaying an image sequence input from the video input terminal 9 on the display unit 4 and transmitting the image sequence from the portable telephone set 1 by the operations of the display switching key 5a, the image input switching key 5b, the image sequence transmission key 5c, and the transmission/storage switching key 5e. A video signal output from the VTR (or video camera) is input from the video input terminal 9.

In this manner, by the processes shown in FIG. 4 and FIG. 5, an image sequence (or an image sequence photographed by the video camera) reproduced from the VTR is displayed on the display unit 4 and converted into a file format. The file format is transmitted from the portable telephone set 1.

In the middle of the processes, when the user wants to transmit a static image, a static image file is still transmitted from the portable telephone set 1 by the operation of the static image transmission key 5d.

In addition, when the user wants to store an image sequence or a static image without immediately transmitting the image sequence or the static image, an image sequence file or a static image file is still stored in the semiconductor memory 23 by the operation of the transmission/storage switching key 5e.

In this manner, according to the portable telephone set 1, an image sequence or moving image can be photographed by only the portable telephone set 1 and then transmitted.

In order to change a photographing angle, it is sufficient to pivot or rotate only the camera unit 3 without changing the direction of the portable telephone body 2 itself. In order to check a present angle, it is sufficient to see an image displayed on the display unit 4 of the portable telephone set 1 itself. For this reason, even in speech communication using the portable telephone set 1, photographing can be easily performed at a desired angle.

In addition, an image sequence reproduced from an external VTR and input from the video input terminal 9 or an image sequence photographed by an external video camera and input from the video input terminal 9 can be displayed on the display unit 4 and transmitted from the portable telephone set 1 (with respect to the display, the portable communication device is used as a display unit).

Furthermore, an image sequence photographed by the camera unit 3 or an image sequence input from the video input terminal 9 can also be transmitted as a static image.

Furthermore, an image sequence or a static image can also be stored in the portable telephone set 1 and then transmitted without immediately transmitting the image sequence or the static image from the portable telephone set 1.

Instruction in such a switching operation can be arbitrarily performed such that a user operates the keyboard 5.

In addition, an image sequence photographed by the camera unit 3 can also be output from the video output terminal 10 to be stored in an external VTR or to be displayed on the screen of an external television set (i.e., the portable communication device can be used as a video camera).

Furthermore, since an image sequence or a static image received by the portable telephone set 1 is displayed on the display unit 4 of the portable telephone set 1 itself, the received image sequence or the static image can be displayed by only the portable telephone set 1.

Furthermore, the display unit 4 is used to display an image and also to display information obtained in a standard operation. For this reason, in comparison with the case in which a display unit for displaying an image and a display unit for displaying information obtained in a standard operation are independently arranged, a portable communication device can be decreased in size.

Figure 6:
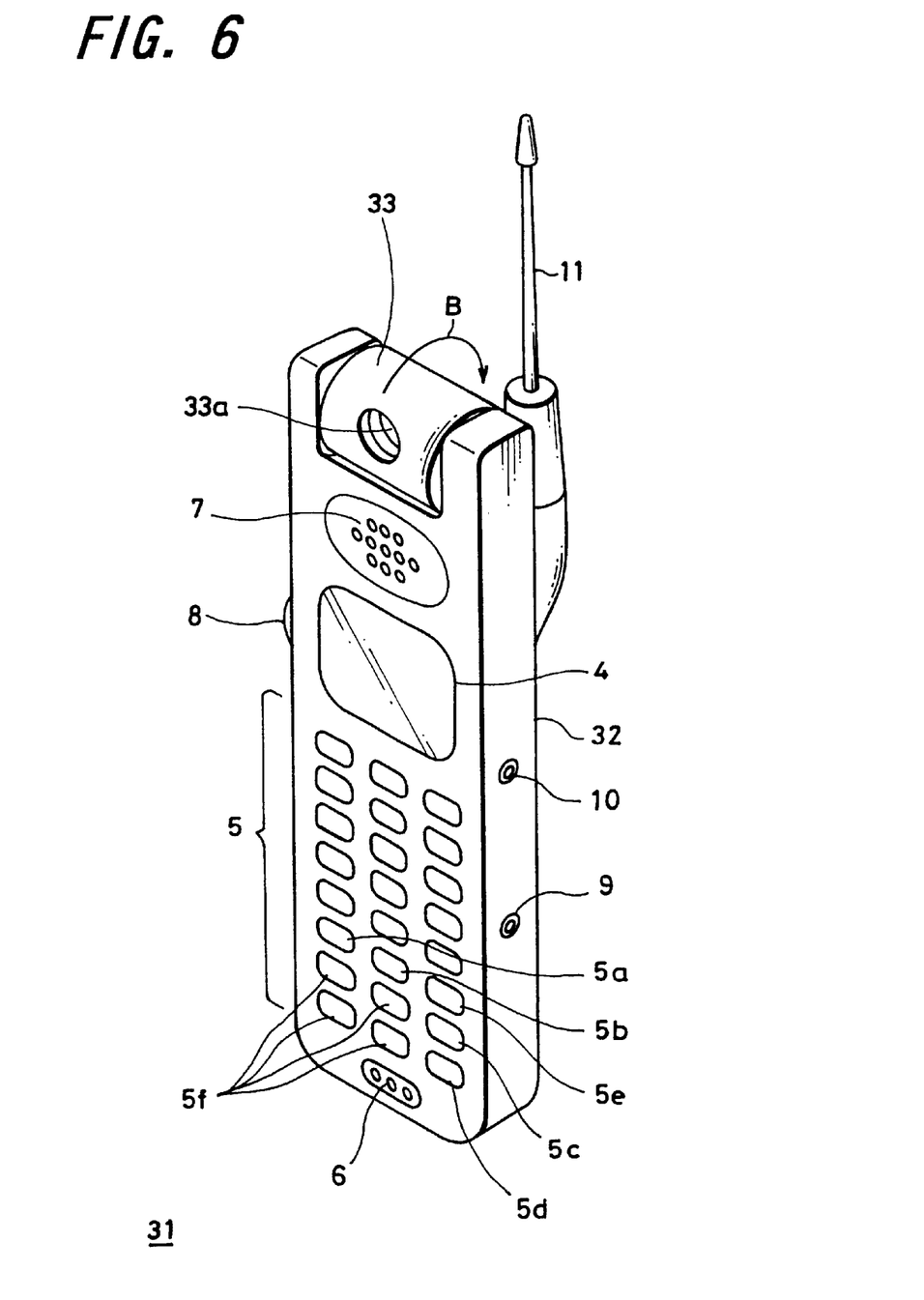
FIG. 6 is a perspective view showing another example of the outside configuration of the portable telephone set to which the present invention is applied.
Figure 7:
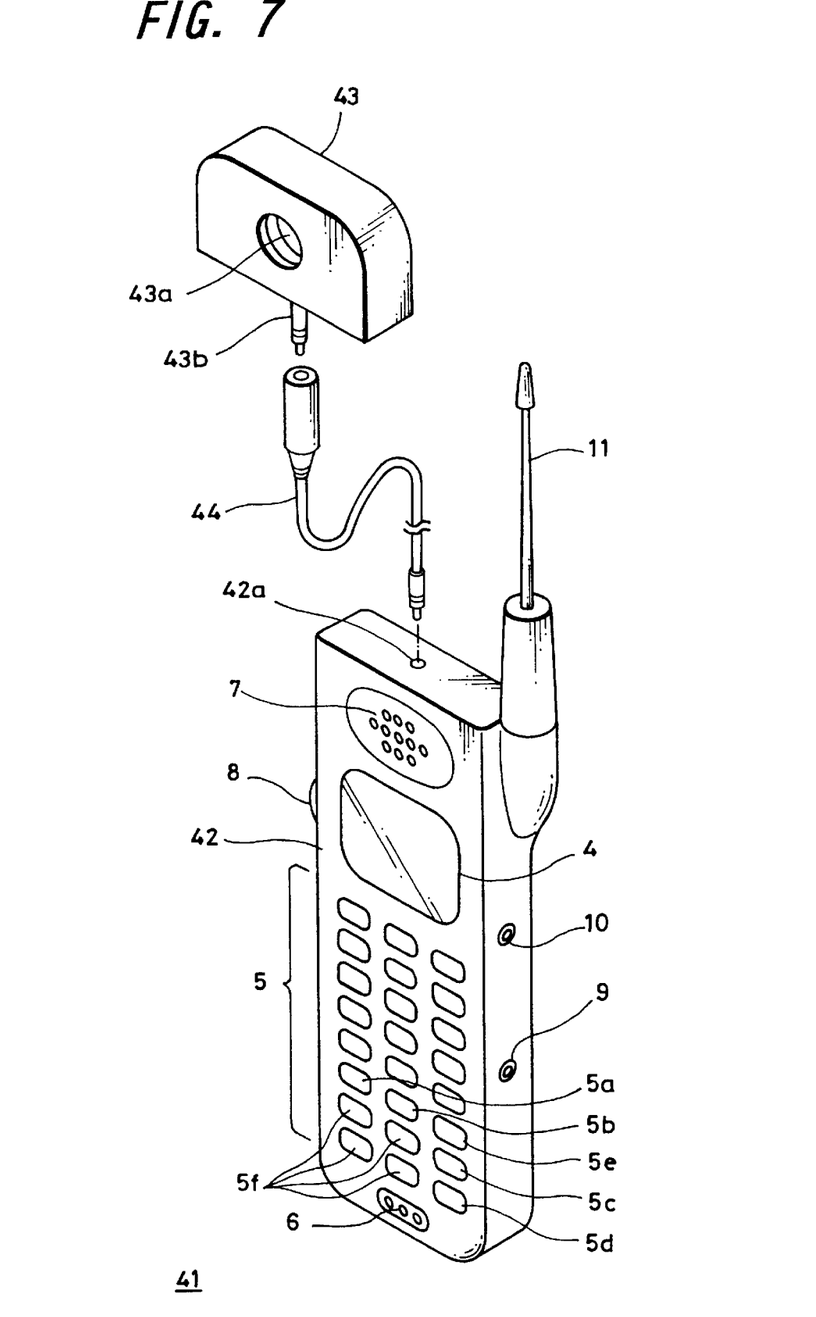
FIG. 7 is a perspective view showing still another example of the outside configuration of the portable telephone set to which the present invention is applied.
Figure 8:
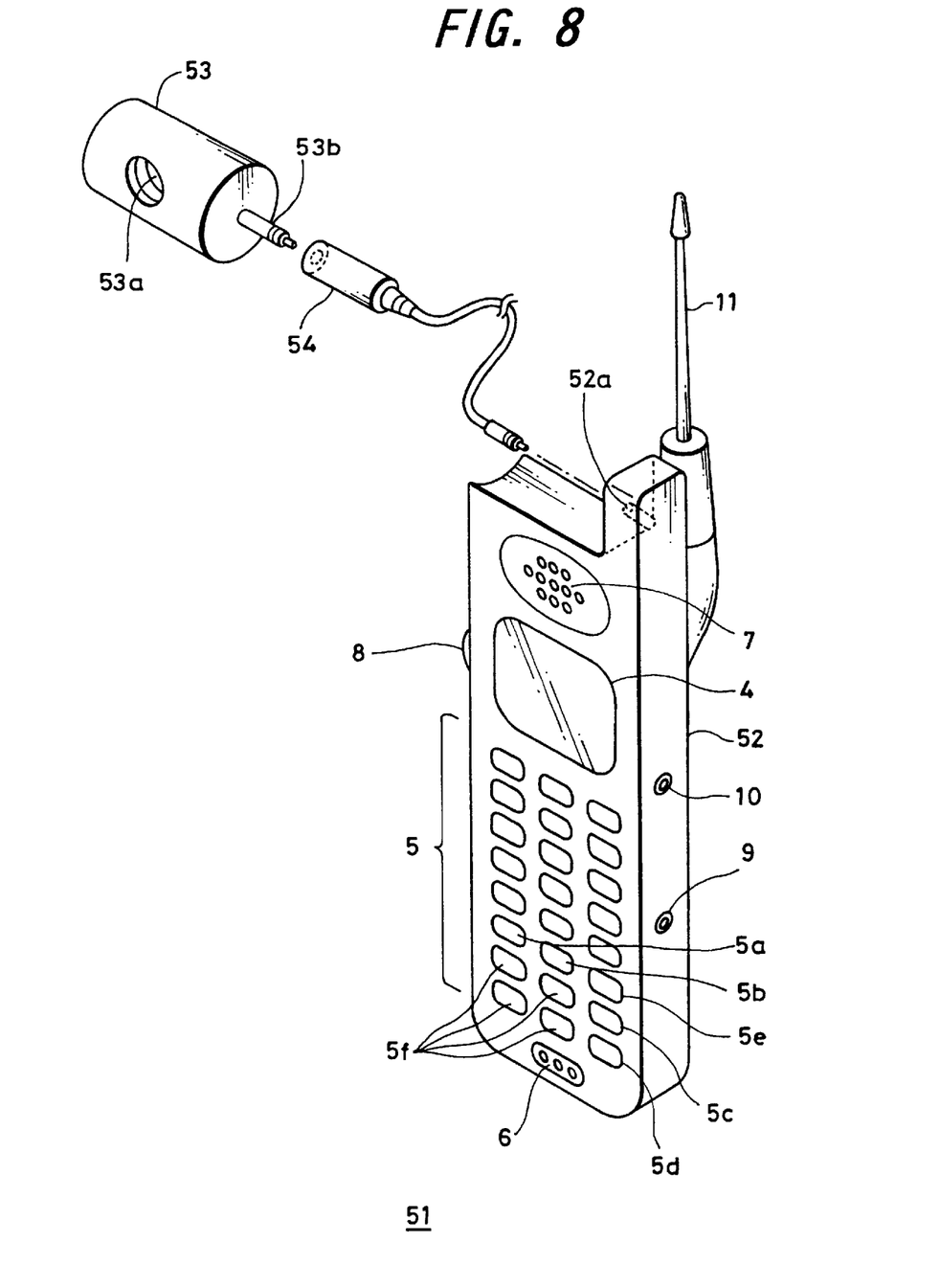
FIG. 8 is a perspective view showing still another example of the outside configuration of the portable telephone set to which the present invention is applied.

Other examples (modifications of FIG. 1) of the outside configuration of a portable telephone set to which the present invention is applied are shown in FIG. 6 to FIG. 8, respectively. The same reference numerals as in FIG. 1 denote the same parts in FIG. 6 to FIG. 8.

In a portable telephone set 31 in FIG. 6, a portable telephone body 32 has a recessed upper portion, and a camera unit 33 is pivotally or rotatably attached to a shaft member (not shown) extending in the direction of width of the portable telephone body 32.

The portion in the recessed portion on the upper surface of the portable telephone body 32 has an cylindrical inner peripheral surface along the direction of width of the portable telephone body 32, and the camera unit 33 has a cylindrical outer peripheral surface along the direction of width of the portable telephone body 32.

In this manner, the camera unit 33 can be pivoted or rotated by 360° in the direction of an arrow B in FIG. 6 with respect to the portable telephone body 32.

Therefore, when only the camera unit 33 is pivoted or rotated by hand without changing the direction of the portable telephone body 32, a lens 33a can be pointed to the front-surface side of the portable telephone body 32 to photograph the user herself/himself, or the lens 33a can be pointed to the rear-surface side or the upper-surface side of the portable telephone body 32 to photograph the surrounding landscape.

When the camera unit 33 is pivoted on the rear-surface side of the portable telephone body 32, the vertical direction of the image pickup element in the camera unit 33 is opposite to the vertical direction of the image pickup element set when the camera unit 33 is pivoted to the front-surface side of the portable telephone body 32.

For this reason, it is preferable that a sensor for detecting a pivotal or rotational position of the camera unit 33 is arranged in the portable telephone set 31 (or a key to be operated by a user when the camera unit 33 is pivoted on the rear-surface side of the portable telephone body 32 is arranged on the keyboard 5) and the video signal processing circuit in the portable telephone set 31 processes output signals from the image pickup element in the reverse order in each frame, when the camera unit 33 is pivoted on the rear-surface side of the portable telephone 32.

In a portable telephone set 41 in FIG. 7, a portable telephone body 42 and a camera unit 43 are independently arranged.

A cylindrical plug (e.g., mini-stereo plug) 43b is formed on the lower surface of the camera unit 43, and a jack 42a used to insert the plug 43b thereinto is formed on the upper surface of the portable telephone body 42.

In this manner, the camera unit 43 can be detachably connected to the portable telephone body 42 by inserting the plug 43b into the jack 42a such that the camera unit 43 can be pivoted by 360° around the shaft member of the portable telephone body 42 with respect to the portable telephone body 42.

Therefore, as also shown in FIG. 7, the plug 43b is removed from the jack 42a (i.e., the camera unit 43 is detached from the portable telephone body 42), and an extension cable 44 is connected to the plug 43b. The extension cable 44 is inserted into the jack 42a to connect the camera unit 43 and the portable telephone body 42 to each other, so that the direction of the camera unit 43 can be freely changed. Photographing can be more easily performed at a desired angle.

In addition, when only the camera unit 43 is pivoted with a hand while the plug 43b is inserted into the jack 42a, a lens 43a can be pointed to the front-surface side of the portable telephone body 42 to photograph a user herself/himself, or the lens 43a can be pointed to the rear-surface side or the side-surface side of the portable telephone body 42 to photograph the surrounding landscape.

Even in a portable telephone set 51 in FIG. 8, a portable telephone body 52 and a camera unit 53 are independently arranged.

A cylindrical plug (e.g., mini-stereo pin plug) 53b is formed on the side surface of the camera unit 53.

The upper portion of the portable telephone body 52 has a projecting portion at one end, and a jack 52a used to insert a plug 53b thereinto is formed on a side surface of the projecting shape.

The portion of the upper surface of the portable telephone body 52 except for the projecting shape portion has an cylindrical inner peripheral surface along the direction of width of the portable telephone body 52, and the camera unit 53 has a cylindrical outer peripheral surface.

In this manner, the camera unit 53 can be detachably connected to the portable telephone body 52 by inserting the plug 53b into the jack 52a such that the camera unit 53 can be detachably connected to the portable telephone body 52 and can be pivoted by 360° around the shaft member of the portable telephone body 52 with respect to the portable telephone body 52.

Therefore, as shown in FIG. 8, the plug 53b is removed from the jack 52a (i.e., the camera unit 53 is detached from the portable telephone body 52), and an extension cable 54 is connected to the plug 53b. The extension cable 54 is inserted into the jack 52a to connect the camera unit 53 and the portable telephone body 52 to each other, so that the direction of the camera unit 53 can be freely changed. Photographing can be more easily performed at a desired angle.

In addition, when only the camera unit 53 is pivoted with a hand while the plug 53b is inserted into the jack 52a, a lens 53a can be pointed to the front-surface side of the portable telephone body 52 to photograph a user herself/himself, or the lens 53a can be pointed to the rear-surface side or the side-surface side of the portable telephone body 52 to photograph the surrounding landscape.

In the example described above, the display switching key 5a, the image input switching key 5b, the image sequence transmission key 5c, the static image transmission key 5d, the transmission/storage switching key 5e, and the camera operation key 5f are arranged on the keyboard 5. However, all or some of these keys may be omitted, and the functions of the omitted keys may be given to the jog dial 8.

The following modification may also be used. For example, the display switching key 5a and the image input switching key 5b are omitted, a switching operation which displays any one of an image photographed by the camera unit and an image input from the video input terminal on the display and transmits the image from the portable telephone set or a switching operation which displays any one of an image and information obtained a standard operation is displayed on the display unit are automatically performed by the microprocessor in the portable telephone set (e.g., the image is displayed in preference to the information obtained in the standard operation, and the image photographed by the camera unit is displayed and transmitted in preference to the image input from the video input terminal).

In the example described above, an image file is singularly transmitted from the portable telephone set. However, when an image file read from a semiconductor memory is transmitted, the image file may be transmitted as an attached file of an electronic mail.

In the examples described above, the camera unit is connected to the upper portion of the portable telephone body. However, the camera unit may be connected to a proper portion (e.g., lower portion) of the portable telephone body except for the upper portion.

In the examples described above, there is arranged the camera unit having the same configuration as that of a video camera. However, a camera unit having the same configuration as that of a digital still camera may be arranged, so that only a static image is photographed, displayed, transmitted, and stored.

In the example described above, an image sequence or moving image is output from the video output terminal to be stored in an external VTR or displayed on the screen of an external television set. However, in addition to this configuration, a static image may be transmitted by infrared ray communication, so that the static image may be captured by a personal computer having an infrared ray terminal.

In the example described above, one display unit is commonly used to display an image and to display information obtained in a standard operation. However, a display unit for displaying an image may be arranged independently of a display unit for displaying information obtained in the standard operation (e.g., an openable/closable lid covers the front surface of the portable telephone body, and a display unit for displaying an image is arranged on the rear surface of the lid).

In addition, the present invention is applied to the portable telephone set in the example described above. However, the present invention may be applied to an appropriate portable communication device (e.g., a PHS, an armature radio device or the like) other than the portable telephone set.

The present invention is not limited to the examples described above. The present invention can employ various modifications or changes without departing from the spirit and scope of the invention.

As described above, according to the portable communication device, since an image photographed by the image pickup means of the portable communication device itself can be transmitted from the portable communication device, the following advantage can be achieved. That is, an image can be photographed and transmitted by only the portable communication device.

In order to change a photographing angle, it is sufficient to change the direction of the image pickup means of the portable communication device itself. In order to check a present angle, it is sufficient to see an image displayed on the display means of the portable communication device itself. For this reason, the following advantage can be achieved. That is, even in an interaction using the portable communication device, photographing can be easily performed at a desired angle.

In addition, an image output from an external device can be advantageously displayed on the display means of the portable communication device and also transmitted from the portable communication device (with respect to the display, the portable communication device is used as a display unit).

Furthermore, an image photographed by the image pickup means can also be advantageously recorded on an external device or displayed on an external display unit (i.e., the portable communication device is used as an electronic camera).

According to the portable communication device, in order to change a photographing angle, it is sufficient to pivot or rotate only the image pickup means without changing the direction of the portable communication device body itself. For this reason, the following advantage can be achieved. That is, photographing can be more easily performed at a desired angle.

According to the portable communication device, since the image pickup means and the portable communication device body are connected to each other through the extension cable, so that the direction of the image pickup means can be freely changed. For this reason, the following advantage can be achieved. That is, photographing can be more further easily performed at a desired angle.

According to the portable communication device, the display means is commonly used to display an image and to display information obtained in a standard operation. For this reason, in comparison with the case in which a display unit for displaying an image and a display unit for displaying information obtained in a standard operation are independently arranged, the portable communication device can be decreased in size.

According to the portable communication device, the following advantages can also be achieved. That is, an image sequence or moving image photographed by the image pickup means, an image sequence reproduced from an external VTR and input from the video input terminal, and an image sequence photographed by an external video camera and input from the video input terminal can be displayed on the display means and also transmitted from the portable communication device, these image sequences can be transmitted as static images, and the image sequence photographed by the image pickup means is recorded on an external VTR and displayed on the screen of an external television (i.e., the portable communication device is used as a video camera).

According to the portable communication device, the following advantage can be achieved. That is, an image photographed by the image pickup means and an image input from the input terminal can be stored in the portable communication device and then transmitted without immediately being transmitted from the portable communication device.

In addition, according to the portable communication device, the following advantages can be achieved. A user operates buttons to arbitrarily perform instruction in a switching operation in which any one of an image photographed by the camera unit and an image input from the video input terminal is displayed on the display unit and transmitted from the portable telephone set, an operation in which any one of an image and information obtained in a standard operation is displayed on the display unit, a switching operation in which any one of an image sequence and a static image is transmitted, and a switching operation an image is transmitted or stored.

Furthermore, according to the portable communication device, the following advantage can be achieved. That is, an image received by the portable communication device can be displayed by only the portable communication device.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A portable telephone communication device comprising:
   a housing;
   means including a microphone, a speaker, and a plurality of keys representative of predetermined characters for enabling a user to perform telephone communications;
   image pickup means having a rotatably mounted camera for photographing a first image;
   an input terminal for inputting a second image from the outside;
   display means for displaying a selected one of the first image and the second image;
   image input switching means for performing a switching operation in which any one of the first image photographed by the image pickup means and the second image from the input terminal is displayed on the display means and transmitted from the portable telephone communication device;

means for receiving image data transmitted in a wireless manner from a transmitting apparatus at a remote location representative of one of an image data sequence and a static data image, for automatically determining whether the received image data is representative of the image data sequence or the static data image, and for processing the received image data in accordance with a first processing method when the received image data is determined to represent the image data sequence and for processing the received image data in accordance with a second processing method which is different from the first processing method when the received image data is determined to represent the static data image;

wherein said user is permitted to simultaneously view said image data sequence and transmit one or more static data images from said image data sequence by activating one of said plurality of keys; and an output terminal for outputting one of the image photographed by the image pickup means and the processed image data, whereby the enabling means and said display means are arranged in said housing.

2. A portable communication device comprising:

a main body;

means including a microphone, a speaker, and a plurality of keys representative of predetermined characters for enabling a user to perform telephone communications;

image pickup means pivotally or rotatably and/or detachably connected to said main body of the portable communication device by attaching means;

an input terminal for inputting an image from the outside;

display means for displaying the image; and image input switching means for performing a switching operation in which any one of an image photographed by the image pickup means and an image input from the input terminal is displayed on the display means and transmitted from the portable communication device;

means for receiving image data transmitted in a wireless manner from a transmitting apparatus at a remote location representative of one of an image data sequence and a static data image, for automatically determining whether the received image data is representative of the image data sequence or the static data image, and for processing the received image data in accordance with a first processing method when the received image data is determined to represent the image data sequence and for processing the received image data in accordance with a second processing method which is different from the first processing method when the received image data is determined to represent the static data image;

wherein said user is permitted to simultaneously view said image data sequence and transmit one or more static data images from said image data sequence by activating one of said plurality of keys; and an output terminal for outputting one of the image photographed by the image pickup means and the processed image data, whereby the enabling means and said display means are arranged in said main body.

3. A portable communication device according to claim 2, further comprising:

storing means for storing an image;

transmission/storage switching means for performing a switching operation in which the image is transmitted from the portable communication device or stored in the storage means.

4. A portable communication device according to claim 2, wherein the display means is commonly used to display an image and to display information obtained in a standard operation in the portable communication device, and further comprising display switching means for performing a switching operation in which any one of the image and the information obtained in the standard operation is displayed on the display means.

5. A portable communication device according to claim 4, wherein the image pickup means is image pickup means for photographing an image sequence or moving image, the input terminal is a video input terminal, and the output terminal is a video output terminal, and further comprising:

static image capture means for capturing a static image from the image sequence; and image sequence/static image switching means for performing a switching operation in which any one of the image sequence and the static image captured by the static image capture means is transmitted from the portable communication device.

6. A portable communication device according to claim 5, further comprising:

storage means for storing an image; and transmission/storage switching means for performing a switching operation in which the image is transmitted from the portable communication device or stored in the storage means.

7. A portable communication device according to claim 4, further comprising:

storage means for storing an image; and transmission/storage switching means for performing an operation in which the image is transmitted from the portable communication device or stored in the storage means.

8. A portable communication device according to claim 2, wherein the image pickup means is image pickup means for photographing an image sequence or moving image, the input terminal is a video input terminal, and the output terminal is a video output terminal, and further comprising:

static image capture means for capturing a static image from the image sequence; and image sequence/static image switching means for performing a switching operation in which any one of the image sequence and the static image captured by the static image capture means is transmitted from the portable communication device.

9. A portable communication device according to claim 8, further comprising:

storage means for storing an image; and transmission/storage switching means for performing a switching operation in which the image is transmitted from the portable communication device or stored in the storage means.

10. A communication method for a portable communication device, comprising:

the step of enabling a user to perform telephone communications by use of a telephone means which includes a microphone, a speaker, and a plurality of keys representative of predetermined characters;

the step of selecting one of images respectively input from image pickup means having a rotatably mounted camera and an image input terminal provided on the portable communication device;

the step of displaying the selected image on display means;

the step of selecting one of an image sequence transmission mode or a static image transmission mode;

the step of, when the selected mode is the image sequence transmission mode, transmitting an image sequence when a transmission instruction is set and temporarily storing the image sequence when the transmission instruction is not set;

the step of, when the selected mode is the static transmission mode, capturing static image for the image sequence and transmitting the static image when a transmission instruction is set, and temporarily storing the static image in a memory when the transmission instruction is not set, and the step of receiving image data transmitted in a wireless manner from a transmitting apparatus at a remote location representative of one of an image data sequence and a static data image, for automatically determining whether the received image data is representative of the image data sequence or the static data image, and for processing the received image data in accordance with a first processing method when the received image data is determined to represent the image data sequence and for processing the received image data in accordance with a second processing method which is different from the first processing method when the received image data is determined to represent the static data image, wherein said user is permitted to simultaneously view said image data sequence and transmit one or more static data images from said image data sequence by activating one of said plurality of keys; and whereby the telephone means and said display means are arranged in a common housing.

* * * * *